United States Patent [19]

Rosenberg et al.

[11] E Patent Number: Re. 32,052

[45] Reissued Date of Patent: Dec. 24, 1985

[54] VETERINARY EXAMINATION TABLE

[75] Inventors: Alexander J. Rosenberg, Roslyn; Philip M. Rosenberg, Churchville, both of Pa.

[73] Assignee: Animal Veterinary Products, Inc., Galesburg, Ill.

[21] Appl. No.: 312,003

[22] Filed: Oct. 16, 1981

Related U.S. Patent Documents

Reissue of:

[64] Patent No.: 4,170,961
Issued: Oct. 16, 1979
Appl. No.: 820,125
Filed: Jul. 29, 1977

[51] Int. Cl.[4] ..... A61D 3/00

[52] U.S. Cl. ..... 119/103; 177/147

[58] Field of Search ..... 119/103, 98, 99; 177/147, 225, 154

[56] References Cited

U.S. PATENT DOCUMENTS

| | | | |
|---|---|---|---|
| 1,116,268 | 11/1914 | Hansen | 177/225 X |
| 1,404,173 | 1/1922 | Barnard | 119/103 |
| 3,120,836 | 2/1964 | Brauning | 119/103 |
| 3,169,594 | 2/1965 | Myers | 177/225 X |
| 3,208,432 | 9/1965 | Fisk | 119/103 |
| 3,330,258 | 7/1967 | Rosenberg | 119/103 |
| 3,998,284 | 12/1976 | James | 177/147 |

FOREIGN PATENT DOCUMENTS

| | | | |
|---|---|---|---|
| 222437 | 6/1959 | Australia | 119/103 |

*Primary Examiner*—Hugh R. Chamblee
*Attorney, Agent, or Firm*—Mason, Kolehmainen, Rathburn & Wyss

[57] ABSTRACT

An improved veterinary examination table is provided which includes means for determining the weight of the animal being examined. In order to facilitate the examination of animals of varying weights, the height of the table may be varied through the use of a hydraulic actuator. A horizontal examination platform is vertically movable within a frame having vertical support members. A scale is interposed between the examination platform and the frame in a manner to support the entire weight of the platform when the examination platform is moved to its lowermost position to thereby allow the weight of an animal to be determined. Elevation of the examination platform automatically deactivates the scale.

12 Claims, 6 Drawing Figures

VETERINARY EXAMINATION TABLE

Matter enclosed in heavy brackets [ ] appears in the original patent but forms no part of this reissue specification; matter printed in italics indicates the additions made by reissue.

BACKGROUND OF THE INVENTION

This invention relates to examination platforms in general and to the combination of an examination platform and a scale suitable for animals in particular.

Veterinary examining tables of the elevating type have been developed to lift small animals such as cats or large animals such as large dogs from the floor to examining height without physical exertion and without danger to the veterinarian. Suitable restraints have been employed to make the examination of any size animal easier, quicker, safer and more humane.

An important part of any examination has been to determine the weight of the animal. In the past, this has usually been accomplished by placing the animal on a scale and the scale has usually been separate and apart from the examining table. Treatment and examination then took place on an examination table, thereby requiring two separate procedures. In the case of an injured animal or a particularly nervous or unruly dog, these procedures resulted in increased time and effort on the part of the veterinarian and in some instances, discomfort to the animal.

One type of combination examination and weighing table has been developed by Schroer Manufacturing Company, Kansas City, Missouri and sold under the trademark "Shor-Line". This device, however, includes no provision for elevation of the table or for restraint of the animal. Accurate weighing without a restraint device has proved difficult in that it was usually necessary to hold the animal while weighing, thereby introducing a good possibility for error.

The desirability of minimizing movement of sick, injured, or unruly animals has been recognized in the prior art. U.S. Pat. No. 3,330,258 issued July 11, 1967 to Alexander J. Rosenberg is an example of such an invention. This patent teaches an examination platform or table in which the height thereof may be adjusted from near floor level to a comfortable examining level. Additionally, it teaches a restraint mechanism whereby the animal is secured to the table so as to prevent injury to both the animal and the veterinarian. By virtue of its being adjustable, the animal need not be physically raised from the floor or ground to the examination and treatment platform.

Although the table taught by the Rosenberg patent shortened the number of steps and the time involved in examining and treating a sick or injured animal, in many instances it is desirable or necessary that the animal be weighed. The weighing of the animal usually constitutes a separate step and until now, involved the animal being removed to or from a different location. In some cases it also involved the animal being manually lifted or held to the scale. Such movement constituted an additional time consuming step and presented problems of possible aggravation and irritation to the animal. Further, the lifting of large dogs or other animals weighing over one hundred pounds was usually impractical, if not impossible.

SUMMARY OF THE INVENTION

The present invention comprises an examination table including a horizontal examination platform that is vertically adjustable relative to a supporting frame in combination with a scale. A hydraulic actuator is mounted upon the frame to raise and lower the examination platform automatically.

A force transducer or scale is interconnected between the frame and the movable platform. When the actuator is contracted so that the platform is in its lowermost position, the entire weight of the platform and any animal which may be placed thereon is supported by the force transducer. In this manner the animal may be easily weighed without need to manually life or hold the animal to a scale. Upon function of the hydraulic actuator to lift or elevate the examination table relative to the frame, the scale automatically disassociates from the table, and does not affect or alter in any manner its usual function.

Accordingly it is an object of the present invention to provide an improved veterinary examination table of the type set forth.

It is another object of the present invention to provide a novel veterinary examination table for treatment of animals which eliminates the requirement that the animal be manually held for weighing.

It is another object of the invention to provide an examination and treatment table for animals which includes means for weighing the animal without manually holding the animal.

It is still another object of the present invention to provide an examination and treatment table for animals which is vertically adjustable from near floor level to examination level and which includes scale means for weighing the animal, the scale means being activated at or near floor level and being inactive at examination level.

It is still another object of the present invention to provide an examination and treatment platform for animals which includes a frame, a movable platform, and a scale associated therewith.

Other objects and a fuller understanding of the invention will be had by referring to the following description and claims of preferred embodiments thereof, taken in conjunction with the accompanying drawings wherein like reference characters refer to similar parts throughout, and in which:

DESCRIPTION OF THE PREFERRED EMBODIMENT OF THE INVENTION

Figure 2:
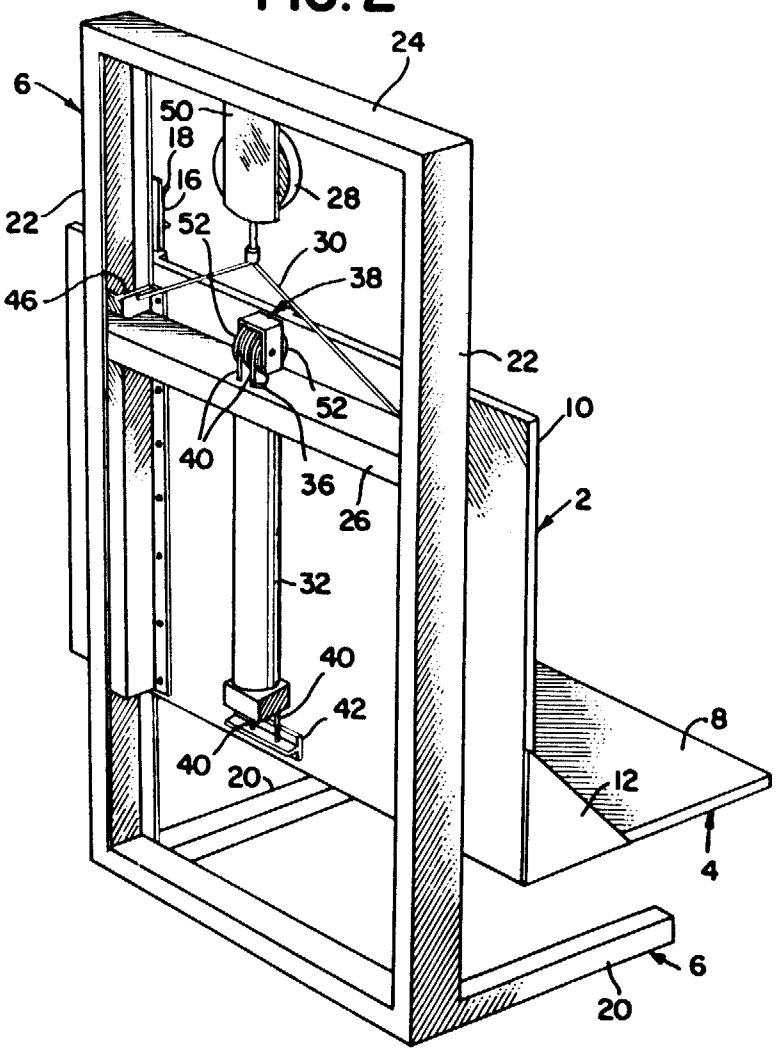
FIG. 2 is a rear perspective view of the device of FIG. 1.

Although specific terms are used in the following description for the sake of clarity, these terms are intended to refer only to the particular structure of the invention selected for illustration in the drawings and are not intended to define or limit the scope of the invention.

Figure 1:
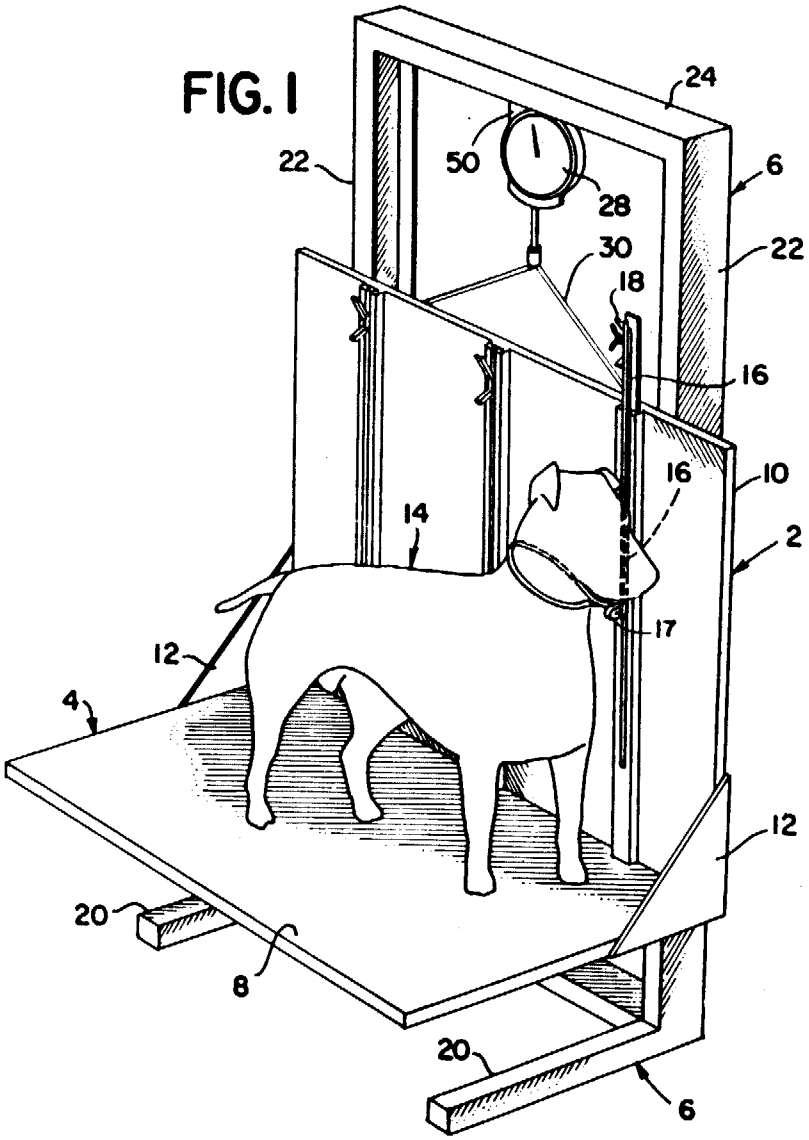
FIG. 1 is a front perspective view of the present invention showing an animal, such as a dog, restrained to the table.

Referring now to the drawings, a preferred embodiment of the examination table 2 is shown in FIG. 1. A vertically adjustable examination platform 4 is shown mounted in adjustable manner upon a stationary frame 6. The platform 4 includes a horizontal member or table 8 and a back 10 which may be integrally secured to the table and reinforced by triangular end plates or fillets 12. An animal, such as a dog 14, is shown restained on the table 8. The dog 14 is restrained to the back 10 by one or more leads 16 which are drawn through hooks 17 and then removably secured to cleats 18 at a safe distance from the dog's mouth. The cleats 18 are automatically vertically adjustable with respect to the back 10 whereby animals of varying height and position may be accommodated.

The frame 6 includes legs 20 and a pair of spaced, vertical members 22 which are connected to one another at their upper ends by an upper horizontal brace or cross head 24. An intermediate horizontal cross piece 26 also interconnects the spaced, vertical members as may be seen in FIGS. 2 and 3. A scale 28 is secured to the upper horizontal cross piece 24 by a bracket 50 and is flexibly connected to the examination platform 4 by cable 30.

Figures 3, 4, 5, 6:
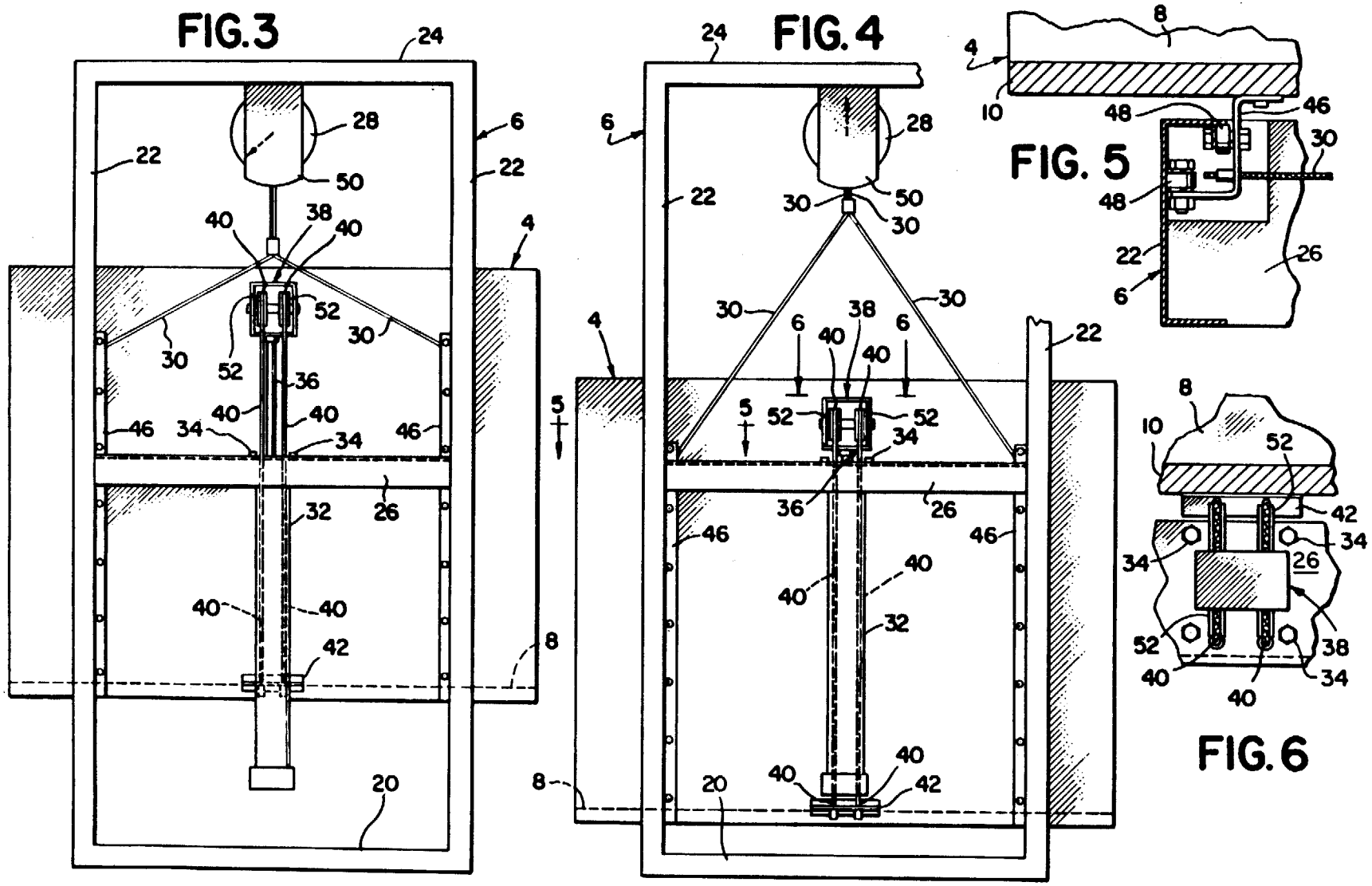
FIG. 3 is a rear elevation view of the present invention showing the examination platform in a raised position.
FIG. 4 is a rear elevation view of the invention similar to FIG. 3, showing the examination platform in its lowermost position and wherein the examination platform is supported by the scale.
FIG. 5 is an enlarged, partial, cross-sectional view taken along line 5—5 of FIG. 4, showing the interface between the examination platform and the vertical members of the frame.
FIG. 6 is an enlarged, partial, cross-sectional view taken along line 6—6 of FIG. 4, looking in the direction of the arrows.

Referring now to FIGS. 2, 3 and 4, the manner in which the examination platform 4 is movable relative to the frame 6 may be seen. A hydraulic actuator or cylinder 32 is secured to the intermediate cross piece 26 and extends generally downwardly therefrom. This may be accomplished in any suitable, well known manner, but is accomplished in the preferred embodiment by nut and bolt combinations 34 which act to secure the parts together. The hydraulic actuator or cylinder 32 includes a piston rod 36 which is vertically movable relative to the fixed portions of the actuator upon function of a hydraulic circuit (not illustrated). Cables 40 are connected to the bottom of the platform 4 by a fixture 42 which is secured to the back 10 near the bottom thereof. The opposite ends of the cables 40 are connected to the intermediate horizontal cross piece 26 of the frame 6 by any suitable, sturdy means. A pulley assembly 38 is affixed to the top of the piston rod 36 and is vertically moved thereby. Thus as may be seen in FIG. 3, when the hydraulic actuator 32 is functioned to elevate the piston rod 36 to the raised position, the cables 40, which pass over the pulleys 52 of the pulley assembly 38, are also raised to pull the examination platform 4 upwardly.

Referring now to FIG. 6, the fixture 42 is shown affixed to the back 10 and the ends of the cables 40 are secured to the fixture 42. The opposite ends of the cables are secured to the intermediate horizontal cross piece 26 of the frame 6. Nuts 34 are shown which secure the hydraulic actuator 32 to the horizontal cross piece 26. The pulley assembly 38, which is secured to the top of the piston rod 36 is elevated upon activation of the hydraulic cylinder 32. Inasmuch as the cable ends which are secured to the frame member 26 cannot move, the elevation of the piston assembly 38 acts to raise the cable ends secured to the back 10 to thereby elevate the entire examination platform 4.

Referring now to FIG. 5, the interface between the frame 6 and the examination platform 4 is shown. An S-shaped bracket 46 is secured to the back 10 and carries the rollers 48. The rollers 48 provide lateral and forward and backward stability to the examination platform as it is vertically reciprocated. Also shown in FIG. 5 is the connection of the scale cable 30 to the examination platform 4.

When cylinder 32 is activated to raise the examination platform 4 to a comfortable examination level as in FIG. 3, the entire weight of the platform 4 and any animal 14 restrained thereon is borne by the actuator 32 and the frame 6. In this mode, as may be seen in FIG. 3, the cable 30 which is connected to the platform 4 and to the scale 28 is slack and performs no function. When the hydraulic actuator 32 is completely retracted, as illustrated in FIG. 4, to lower the platform 4 to near floor level, the entire weight of the platform 4 and any animal 14 which it is supporting is borne by the scale 28 and the cables 30.

The weight of the animal may be determined by subtracting the known weight of the examination platform from the weight read on the scale. In the preferred embodiment, the scale may be adjusted to read "zero" when the platform 4 is being supported in the lowest position of FIG. 4, to read the correct weight of the animal when it is placed on the platform.

Thus, it is apparent to one skilled in the art that by lowering the platform and placing an animal thereon with relative ease, two results may be accomplished. The animal may be raised to an appropriate height for examination and treatment and may be weighed without moving the animal to an additional location or apparatus. Also, since it is not necessary to hold the animal, the weight of the hands and force necessary to restrain the animal will not produce inaccuracy in weighing.

Although the present invention has been described with reference to particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. An examination table for animals which comprises a frame;

a platform movably connected to said frame and adapted to be vertically movable with respect thereto between a low position and an elevated position;

an actuator means connected to said frame and to said [horizontal] platform for causing relative vertical movement therebetween; and a force transducer means connected to said platform and to said frame for permitting a determination to be made of the weight of an animal placed on the platform, the said force transducer means comprising a scale and [a cable] *an elongated means to connect the platform to the scale, the elongate means being* interconnected between the scale and a portion of the platform , *the elongate means being slack when the*

*platform is in an elevated position, the elongate means being taut when the platform is in the said low position, whereby the weight of the animal may be determined on the scale when the platform is in the low position.*

2. The examination table of claim 1 wherein the actuator means comprises a hydraulic cylinder movable between a lower position and an elevated position.

3. The examination table of claim 2 wherein the actuator means further comprises a pulley assembly movable by the hydraulic assembly and a cable interconnected between the frame and the platform, the cable being engaged by the pulley assembly as it is moved by the cylinder to correspondingly move the platform.

4. The examination table of claim 1 wherein the *elongate means comprises a* cable [is adapted to be tensioned to impose the weight of the platform upon the scale when the platform is in the said low position].

[5. The examination table of claim 1 wherein the cable is untensioned when the platform is in the said elevated position.]

6. An examination table for animals which comprises:

a frame having vertical members, an intermediate member connecting said vertical members, and an upper member connecting said vertical members above the connection of the intermediate member;

an examination platform including a horizontal table connected to a vertical back, said vertical back being adapted to slidably interface with said vertical members of said frame;

a hydraulic cylinder connected to said frame and indirectly connected to said examination platform for raising said platform with respect to said frame from a low position to an elevated position;

the hydraulic cylinder being directly connected to the intermediate member, said cylinder being adapted to move a piston rod relative to the frame, a pulley assembly secured to the piston rod, the pulley assembly being vertically movable as the piston rod is reciprocated by action of the cylinder;

a cable attached to the frame and to the platform, said cable being in contact with the pulley assembly to indirectly interconnect the cylinder and the platform, said cable imposing raising forces upon the platform to elevate said platform when the cylinder is activated to raise the pulley assembly, and the said cable [indirect] *in direct* connection between [the scale] *said frame* and the platform [is] *being* flexible.

7. The examination table as set forth in claim 6 wherein said vertical back member comprises a connection means for slidably engaging said spaced pair of vertical members.

8. The examination table of claim 6 wherein the cable is adapted to be tensioned when the platform is in the said low position whereby the weight of an animal restrained upon the platform can be determined.

9. The examination table of claim 8 wherein the cable is adapted to be untensioned when the platform is moved to an elevated position whereby the weight of an animal restrained upon the table platform cannot be determined.

10. The examination table of claim 6 whereby the cable is adapted to support the entire weight of the platform when the platform is moved to the said low position.

*11. An examination table for animals which comprises* a frame;

*a platform movably connected to the frame and adapted to be vertically movable with respect thereto between a low position and an elevated position;*

*an actuator means interconnected between the frame and the platform to cause vertical movement of the platform relative to the frame, the activator means comprising a fixed portion and a movable portion, the fixed portion being secured to the frame;*

*a scale means directly connected to the frame and indirectly connected to the platform to determine the weight of an animal placed upon the platform; and*

*elongate means indirectly interconnecting the scale means to the platform to actuate the scale means,*

*the elongate means being slack and not activating the scale means when the platform is moved to an elevated position,*

*the elongate means being taut and supporting the platform from the scale means when the platform is in its said low position;*

*whereby the scale means can be utilized to weigh an animal only when the platform is in the low position.*

*12. The examination table of claim 11 wherein the actuator means comprises a hydraulic cylinder.*

*13. The examination table of claim 11 wherein the platform comprises a restraint suitable to secure the animal to the platform.*

* * * * *